United States Patent
Lu et al.

(10) Patent No.: US 10,223,103 B2
(45) Date of Patent: Mar. 5, 2019

(54) ROM FLASHING METHOD AND INTELLIGENT TERMINAL

(71) Applicant: Huawei Technologies Co., Ltd., Shenzhen, Guangdong (CN)

(72) Inventors: Zhijun Lu, Shenzhen (CN); Laifa Zhang, Shenzhen (CN); Yakun Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/726,786

(22) Filed: Oct. 6, 2017

(65) Prior Publication Data

US 2018/0032326 A1 Feb. 1, 2018

Related U.S. Application Data

(63) Continuation of application No. PCT/CN2015/092202, filed on Oct. 19, 2015.

(30) Foreign Application Priority Data

Apr. 9, 2015 (CN) .......................... 2015 1 0165664

(51) Int. Cl.
*G06F 8/65* (2018.01)
*G06F 11/14* (2006.01)
(Continued)

(52) U.S. Cl.
CPC ................ *G06F 8/66* (2013.01); *G06F 8/654* (2018.02); *G06F 9/441* (2013.01); *G06F 9/445* (2013.01);
(Continued)

(58) Field of Classification Search
CPC ............. G06F 11/1417; G06F 11/1438; G06F 11/1453; G06F 11/1489; G06F 8/654;
(Continued)

(56) References Cited

U.S. PATENT DOCUMENTS

| 5,991,860 A | 11/1999 | Gross et al. |
| 8,090,938 B2 * | 1/2012 | Xu ...................... G06F 9/45545 711/100 |

(Continued)

FOREIGN PATENT DOCUMENTS

| CN | 101470668 A | 7/2009 |
| CN | 102096592 A | 6/2011 |

(Continued)

OTHER PUBLICATIONS

J. Miller; "How to-Multi-Boot Your Nexus 5 to Install & Switch Between Custom ROMs More Easily"; Feb. 7, 2014; 4 pages.

(Continued)

*Primary Examiner* — Marina Lee

(57) ABSTRACT

Embodiments of the present disclosure relate to the communications field and disclose a read-only memory (ROM) flashing method and an intelligent terminal, so as to implement lossless ROM flashing on an original system of the intelligent terminal. A solution provided by the embodiments of the present disclosure includes: the intelligent terminal includes a virtual extended system and an original system, the original system runs a factory system file of the intelligent terminal, and the virtual extended system runs a ROM flashing system file; when a ROM flashing instruction entered by a user is received, the ROM flashing system file is written into a storage image file of the virtual extended system; and the virtual extended system is started to run the ROM flashing system file. The present disclosure is used to perform ROM flashing on an intelligent terminal.

10 Claims, 6 Drawing Sheets

(51) Int. Cl.
   *G06F 9/455* (2018.01)
   *G06F 9/445* (2018.01)
   *G06F 9/451* (2018.01)
   *G06F 9/4401* (2018.01)
   *G06F 8/654* (2018.01)

(52) U.S. Cl.
   CPC ............ *G06F 9/4406* (2013.01); *G06F 9/451* (2018.02); *G06F 9/453* (2018.02); *G06F 9/45533* (2013.01); *G06F 11/1417* (2013.01); *G06F 11/1438* (2013.01); *G06F 11/1453* (2013.01); *G06F 11/1489* (2013.01)

(58) Field of Classification Search
   CPC ...... G06F 8/66; G06F 9/4406; G06F 9/45533; G06F 9/441; G06F 9/445; G06F 9/451; G06F 9/453
   USPC .................................................. 717/168–178
   See application file for complete search history.

(56) References Cited

U.S. PATENT DOCUMENTS

| | | | |
|---|---|---|---|
| 2005/0132351 A1* | 6/2005 | Randall | G06F 11/1433 717/168 |
| 2007/0011674 A1* | 1/2007 | Joo | G06F 9/4406 717/174 |
| 2009/0144538 A1* | 6/2009 | Duda | G06F 8/65 713/2 |
| 2009/0172384 A1* | 7/2009 | Anson | G06F 9/44505 713/2 |
| 2012/0102477 A1* | 4/2012 | Kim | G06F 8/654 717/169 |
| 2012/0117555 A1* | 5/2012 | Banerjee | G06F 8/65 717/168 |
| 2013/0104118 A1 | 4/2013 | Somani et al. | |
| 2013/0121126 A1* | 5/2013 | Yamagishi | G02B 7/00 369/112.01 |
| 2013/0326500 A1 | 12/2013 | Park et al. | |

FOREIGN PATENT DOCUMENTS

| | | |
|---|---|---|
| CN | 102420911 A | 4/2012 |
| CN | 103019775 A | 4/2013 |
| CN | 103049289 A | 4/2013 |
| CN | 103391374 A | 11/2013 |
| CN | 104199688 A | 12/2014 |
| CN | 104809010 A | 7/2015 |

OTHER PUBLICATIONS

W. Gordon; "How to Dual Boot Multiple ROMs on Your Android Phone"; Lifehacker Online; Jul. 29, 2011; 4 pages.

Pal et al.; "Rooting of Android Devices and Customized Firmware Installation and its Calibre", International Journal of Scientific Engineering and Technology; vol. 3, Issue 5; May 1, 2014; 4 pages.

Mamamiya; "Use the ROM upgrade file in the virtual system method [Course/Pictures and texts ] "; Retrieved from the internet: http://bbs.duowan.com/thread-41004416-1-1.html; Oct. 7, 2014; total 45 pages.

* cited by examiner

ROM FLASHING METHOD AND INTELLIGENT TERMINAL

CROSS-REFERENCE TO RELATED APPLICATIONS

This application is a continuation of International Application No. PCT/CN2015/092202, filed on Oct. 19, 2015, which claims priority to Chinese Patent Application No. 201510165664.8, filed on Apr. 9, 2015. The disclosures of the aforementioned applications are hereby incorporated by reference in their entireties.

TECHNICAL FIELD

The present disclosure relates to the communications field, and in particular, to a read-only memory (ROM) flashing method and an intelligent terminal.

BACKGROUND

With development of science and technologies, functions of a terminal become increasingly diversified, and therefore an intelligent terminal emerges as the times require. An intelligent terminal refers to a terminal that has an independent mobile operating system and that can extend terminal functions by installing programs such as application software and games. The mobile operating system of the intelligent terminal may be an Android system, an iOS system, a Symbian system, a BlackBerry operating system, a Bada system, a Windows Phone system, a web operating system, or some other embedded Linux systems.

An intelligent terminal is equipped with an original system at delivery. The original system highly matches the terminal. However, due to openness of an open-source mobile operating system of a terminal and rejuvenation and diversification of intelligent terminal users, changing the mobile operating system of the intelligent terminal by means of ROM flashing has become a common behavior.

Currently, a most common ROM flashing manner is to enter a system recovery mode (recovery mode) of a terminal, and when a user selects system recovery or system update according to a prompt, write system software in a ROM flashing package provided by the user into a system partition of a built-in memory in the intelligent terminal, to overwrite an original system. The original system is totally overwritten, and therefore, if the user intends to recover the previous system, ROM flashing needs to be performed again. In addition, a risk exists during a process of performing ROM flashing again, and the recovery mode of the intelligent terminal may even be destroyed. If the recovery mode of the intelligent terminal is destroyed, the intelligent terminal can be repaired only at a repair shop.

SUMMARY

Embodiments of the present disclosure provide a ROM flashing method and an intelligent terminal, and the method can implement lossless ROM flashing on an original system of the intelligent terminal.

To achieve the foregoing objective, the following technical solutions are used in the embodiments of the present disclosure:

According to a first aspect, a ROM flashing method is provided, where the ROM flashing method is applied to an intelligent terminal; the intelligent terminal includes a virtual extended system and an original system, the original system is configured to run a factory system file of the intelligent terminal, and the virtual extended system is configured to run a ROM flashing system file; where the method includes:

receiving a ROM flashing instruction entered by a user;
determining, according to the ROM flashing instruction, a ROM flashing system file selected by the user;
writing the ROM flashing system file into a storage image file of the virtual extended system; and
starting the virtual extended system to run the ROM flashing system file.

With reference to the first aspect, in a first possible implementation manner of the first aspect, after the starting the virtual extended system, the method further includes:

if the virtual extended system fails to be started, setting the original system as a system visible to the user, and deleting the virtual extended system and the storage image file of the virtual extended system.

With reference to the first aspect or the first possible implementation manner of the first aspect, in a second possible implementation manner of the first aspect, before the writing the ROM flashing system file into a storage image file of the virtual extended system, the method further includes:

determining whether the virtual extended system exists in the intelligent terminal; and
if the virtual extended system exists in the intelligent terminal, writing the ROM flashing system file into the storage image file of the virtual extended system; or if no virtual extended system exists in the intelligent terminal, establishing the virtual extended system, and creating a storage image file of the virtual extended system.

With reference to the first aspect, or the first possible implementation manner of the first aspect, or the second possible implementation manner of the first aspect, in a third possible implementation manner of the first aspect, after the writing the ROM flashing system file into a storage image file of the virtual extended system, the method further includes:

setting the virtual extended system as a system visible to the user.

With reference to any one of the first aspect, or the first possible implementation manner of the first aspect to the third possible implementation manner of the first aspect, in a fourth possible implementation manner of the first aspect, after the starting the virtual extended system, the method further includes:

if a switchover instruction entered by the user is received, setting the original system as a system visible to the user.

According to a second aspect, an intelligent terminal is provided, where the intelligent terminal includes a virtual extended system and an original system; the original system is configured to run a factory system file of the intelligent terminal, and the virtual extended system is configured to run a ROM flashing system file; where the intelligent terminal includes:

a receiving unit, configured to receive a ROM flashing instruction entered by a user;
a determining unit, configured to determine, according to the ROM flashing instruction, a ROM flashing system file selected by the user;
a write unit, configured to write the ROM flashing system file into a storage image file of the virtual extended system; and
a control unit, configured to start the virtual extended system to run the ROM flashing system file.

With reference to the second aspect, in a first possible implementation manner of the second aspect, the intelligent terminal further includes:

a first setting unit, configured to: if the virtual extended system fails to be started, set the original system as a system visible to the user, and delete the virtual extended system and the storage image file of the virtual extended system.

With reference to the second aspect or the first possible implementation manner of the second aspect, in a second possible implementation manner of the second aspect, the intelligent terminal further includes:

a judgment unit, configured to determine whether the virtual extended system exists in the intelligent terminal; where the write unit is further configured to: if the judgment unit determines that the virtual extended system exists in the intelligent terminal, write the ROM flashing system file into the storage image file of the virtual extended system; and an establishment unit, configured to: if the judgment unit determines that no virtual extended system exists in the intelligent terminal, establish the virtual extended system, and create a storage image file of the virtual extended system.

With reference to the second aspect, or the first possible implementation manner of the second aspect, or the possible second implementation manner of the second aspect, in a third possible implementation manner of the second aspect, the intelligent terminal further includes a second setting unit, where the second setting unit is configured to: after the write unit writes the ROM flashing system file into the storage image file of the virtual extended system, set the virtual extended system as a system visible to the user.

With reference to the second aspect, or the first possible implementation manner of the second aspect to the third possible implementation manner of the second aspect, in a fourth possible implementation manner of the second aspect, the receiving unit is further configured to: if the receiving unit receives a switchover instruction, set the original system as a system visible to the user.

According to the ROM flashing method and the intelligent terminal provided in the embodiments of the present disclosure, ROM flashing on the intelligent terminal is completed by writing a ROM flashing system file provided by a user into a storage image file of a virtual extended system. In this way, the ROM flashing on the intelligent terminal does not produce any damage because two virtual systems are mutually separated, and a new system installed by means of the ROM flashing is totally separated from an original system delivered with the intelligent terminal. In any case, the original system can be rapidly recovered without loss, thereby implementing lossless ROM flashing on the original system of the intelligent terminal.

BRIEF DESCRIPTION OF THE DRAWINGS

To describe the technical solutions in the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly describes the technical solutions in the embodiments of the present disclosure with reference to the accompanying drawings in the embodiments of the present disclosure.

An embodiment of the present disclosure provides a ROM flashing method, which is applied to an intelligent terminal. The intelligent terminal may be a mobile phone, a tablet computer, and the like, and the present disclosure sets no specific limitation thereto. The intelligent terminal includes a virtual extended system and an original system. The original system is configured to run a factory system file of the intelligent terminal. The virtual extended system is configured to run a ROM flashing system file.

Figure 1:
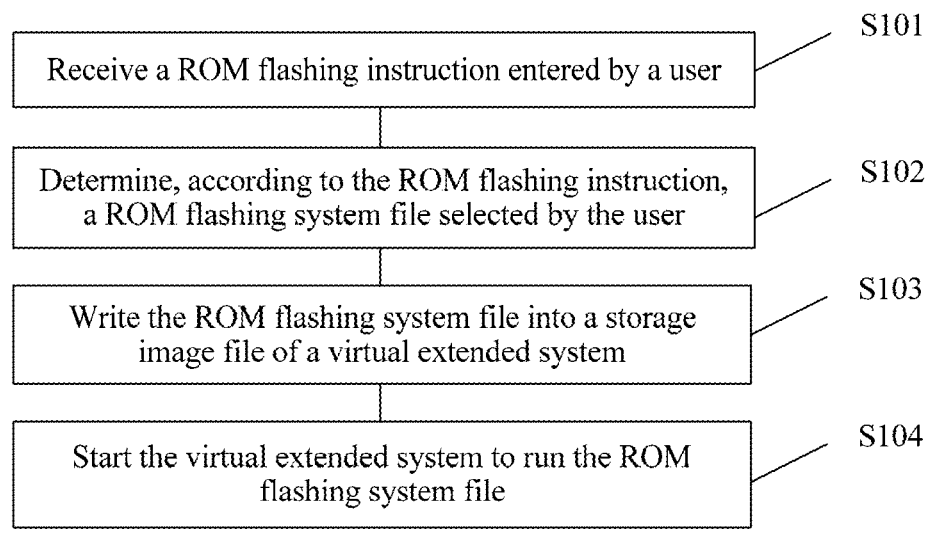
FIG. 1 is a schematic flowchart of a ROM flashing method according to an embodiment of the present disclosure.

Referring to FIG. 1, the method may include the following steps.

S101: Receive a ROM flashing instruction entered by a user.

The ROM flashing instruction may be used to indicate a ROM flashing system file provided by the user.

For example, the ROM flashing instruction is an operation entered by a user who uses an intelligent terminal to perform ROM flashing on the intelligent terminal. The ROM flashing instruction may be a ROM flashing operation and a path of a ROM flashing system file that are selected, by the user who uses the intelligent terminal, after access to a ROM flashing screen of the intelligent terminal. Different intelligent terminals access ROM flashing screens in different manners.

For example, for an intelligent terminal with an Android system, a ROM flashing screen is an screen of a system recovery mode (recovery mode). An entering manner is: When the intelligent terminal is started, a user enables, by pressing a specific button combination (for example, a power supply button+a volume up button), the intelligent terminal to enter the system recovery mode (referred to as recovery mode). It should be noted that, the present disclosure sets no specific limitation on a manner of entering a ROM flashing screen of an intelligent terminal, and the manner can be set according to an actual requirement.

The ROM flashing system file is a system file to be written into the intelligent terminal by the user who uses the intelligent terminal. The ROM flashing system file may be stored in an external memory of the intelligent terminal, or may be stored in a computer. The user may provide a storage path of the ROM flashing system file in the ROM flashing instruction, so that the ROM flashing instruction indicates the ROM flashing system file. When the ROM flashing system file is written into the intelligent terminal, the intelligent terminal may provide, to the user, a system that can be operated by the user.

It should be noted that, the system file described in this specification is a complete system, including an operating system (OS), user screen (UI), and an application (APP). The system file refers to a mobile operating system of the intelligent terminal and application software pre-installed in the intelligent terminal by a manufacturer, and is used to constitute a complete software system of the intelligent terminal and implement various functions of the intelligent terminal.

S102: Determine, according to the ROM flashing instruction, a ROM flashing system file selected by the user.

When inputting the ROM flashing instruction, the user selects a required ROM flashing system file. Therefore, the ROM flashing system file selected by the user can be determined according to the ROM flashing instruction.

Optionally, the ROM flashing system file selected by the user may be determined according to the storage path selected and entered by the user.

S103: Write the ROM flashing system file into a storage image file of the virtual extended system. The original system and the virtual extended system included in the intelligent terminal may be virtualized by using a virtualization technology, and are respectively configured to install system software for use by the user of the intelligent terminal. The virtualization technology used to virtualize the original system and the virtual extended system may use schemes including but not limited to the following two schemes:

Scheme 1: Lightweight Virtualization Scheme.

The lightweight virtualization scheme is to implement a lightweight virtualization layer over an OS layer, and the lightweight virtualization layer is responsible for separating virtual phones (VirtualPhone) and simultaneously operating multiple instances.

Scheme 2: Complete Virtualization Scheme.

The complete virtualization scheme is to implement separation of a virtual machine layer by using system virtualization. An application, a bottom-layer framework, and a kernel of each virtual machine are not affected by another virtual machine.

It should be noted that, the foregoing two schemes are merely examples of implementation manners of the original system and the virtual extended system virtualized by using a virtualization technology, instead of limitations on the implementation manners of the original system and the virtual extended system virtualized by using the virtualization technology. For an original system and a virtual extended system virtualized by using a virtualization technology, both simultaneous running and mutual separation of the two systems shall fall within the protection scope of the present disclosure.

Further, the intelligent terminal may further first determine, before S103, whether a virtual extended system exists. If a virtual extended system exists, S103 is performed. If no virtual extended system exists, a virtual extended system is first established and a storage image file of the virtual extended system is created, and then S103 is performed.

Whether a virtual extended system exists may be determined in a searching manner, a marking manner, or any other manner in which whether a virtual extended system exists can be determined, and the present disclosure sets no limitation on a specific implementation means of determining whether a virtual extended system exists. An implementation manner of establishing the virtual extended system and creating the storage image file of the virtual extended system is an implementation process of the virtualization technology, and details are not described herein.

The storage image file of the virtual extended system refers to an image file corresponding to a virtual storage of the virtual extended system, and is equivalent to a storage partition of a physical system.

Optionally, when the virtual extended system is established, the established virtual extended system may be started immediately after establishment, or may be not started after establishment. The present disclosure sets no specific limitation thereto.

Further, if the established virtual extended system is started immediately after establishment, after the virtual extended system is established and before S103, the virtual extended system needs to be stopped before S103 is performed.

Optionally, an existence manner of the virtualized original system and virtual extended system in the intelligent terminal may be implemented in any one of the following two manners.

First manner: For the virtualized original system and virtual extended system in the intelligent terminal, virtualization may be completed immediately at delivery, that is, the intelligent terminal includes the original system and the virtual extended system at delivery, and the original system is set as a system visible to a user.

Second manner: For the virtualized original system and virtual extended system in the intelligent terminal, when the intelligent terminal is delivered from a factory, only the original system is virtualized to run the original system file, and no virtual extended system exists. When the user who uses the intelligent terminal performs ROM flashing, a virtual extended system is virtualized in the intelligent terminal after S101.

It should be noted that, an implementation manner of the foregoing operation "the intelligent terminal may further first determine, before S103, whether a virtual extended system exists" may not consider the existence manner of the virtualized original system and virtual extended system in the intelligent terminal. The intelligent terminal always determines, before S103, whether a virtual extended system exists.

Further, the implementation manner of the foregoing operation "the intelligent terminal may further first determine, before S103, whether a virtual extended system exists" may consider the existence manner of the virtualized original system and virtual extended system in the intelligent terminal, and includes:

if the existence manner is the foregoing first manner, S103 is performed after S102 and the intelligent terminal does not need to determine whether a virtual extended system exists; or if the existence manner is the foregoing second manner, before S103 is performed, the intelligent terminal first determines whether a virtual extended system exists. The two systems (the original system and the virtual extended system) in the intelligent terminal simultaneously run, but only one is visible to the user. In this way, a manner of performing S104 varies with a system currently visible to the user in the intelligent terminal. The manner includes the following two cases.

First Case:

If the system currently visible to the user in the intelligent terminal is the original system when S101 to S103 are performed, the virtual extended system is first set to a system visible to the user before S104 is performed.

Second Case:

If the system currently visible to the user in the intelligent terminal is the virtual extended system when S101 to S103 are performed, S104 is directly performed after S103.

S104: Start the virtual extended system to run the ROM flashing system file.

Running the ROM flashing system file is validating the ROM flashing system file written into the virtual extended system. Starting the virtual extended system may include any one of the following two cases.

First case: The virtual extended system is not started before S104, and therefore, starting the virtual extended system is starting to run the virtual extended system.

Second case: The virtual extended system has been started before S104, and therefore, starting the virtual extended system is restarting the virtual extended system.

Further, after the intelligent terminal performs S101 to S104, ROM flashing is completed once, and a new system installed by means of the ROM flashing, that is, the virtual extended system, is visible to the user. A purpose of the user for ROM flashing is achieved.

However, a risk exists during ROM flashing, and therefore, ROM flashing does not necessarily succeed all the times. After S104, the method may further include: determining whether the virtual extended system is successfully started.

If the virtual extended system is successfully started, the current ROM flashing succeeds, and the ROM flashing ends.

If the virtual extended system fails to be started, the current ROM flashing fails, and the method may further include: setting the original system as a system visible to the user, and deleting the virtual extended system and the storage image file of the virtual extended system. The current ROM flashing is aborted to avoid impact on use of the intelligent terminal by the user. A heartbeat technology, for example, a watchdog technology, may be used to determine whether a virtual extended system is successfully started. The present disclosure sets no specific limitation thereto.

Still further, a ROM flashing behavior is an artificial behavior of a user, and is greatly variable. After the ROM flashing is completed, there maybe problems such as a matching degree between the new system installed by means of the ROM flashing and the intelligent terminal is low, and user experience is poor. The user may expect to recover to the original system of the intelligent terminal. In this case, the user may input a switchover instruction in the intelligent terminal to switch the intelligent terminal to the original system. In this case, the method further may include:

if a switchover instruction entered by the user is received, setting the original system as a system visible to the user. Implementation of inputting a switchover instruction by the user may be: The user operates the intelligent terminal to enter a switchover screen of the intelligent terminal, and selects a menu option for switching to the original system. The present disclosure sets no limitation on a specific implementation means.

Optionally, when receiving the switchover instruction entered by the user, the intelligent terminal not only can set the original system as a system visible to the user, but also can delete the virtual extended system and the storage image file of the virtual extended system, to improve efficiency of subsequent ROM flashing and prevent the previous system file from affecting newly written system file.

Furthermore, one original system and N virtual extended systems may further be virtualized by using a virtualization technology in an intelligent terminal. N is a positive integer greater than or equal to 1.

The original system is a factory system file of the intelligent terminal, and remains unchanged and unchangeable. At least one virtual extended system serves in turn as a write location of a ROM flashing system file during ROM flashing. In this way, after the current ROM flashing on the intelligent terminal fails, the system can be switched to either the original system or a ROM flashing system of any ROM flashing in ROM flashing of previous N−1 times, to improve user experience.

According to the ROM flashing method in this embodiment of the present disclosure, ROM flashing on an intelligent terminal is completed by writing a ROM flashing system file provided by a user into a storage image file of a virtual extended system. In this way, the ROM flashing on the intelligent terminal does not produce any damage because two virtual systems are mutually separated, and a new system installed by means of the ROM flashing is totally separated from an original system delivered with the intelligent terminal. In any case, the original system can be recovered without loss, thereby implementing lossless ROM flashing on the original system of the intelligent terminal.

Further, the virtual extended system and the original system can run simultaneously, so that a switchover between the systems can be quickly implemented.

Figure 2A:
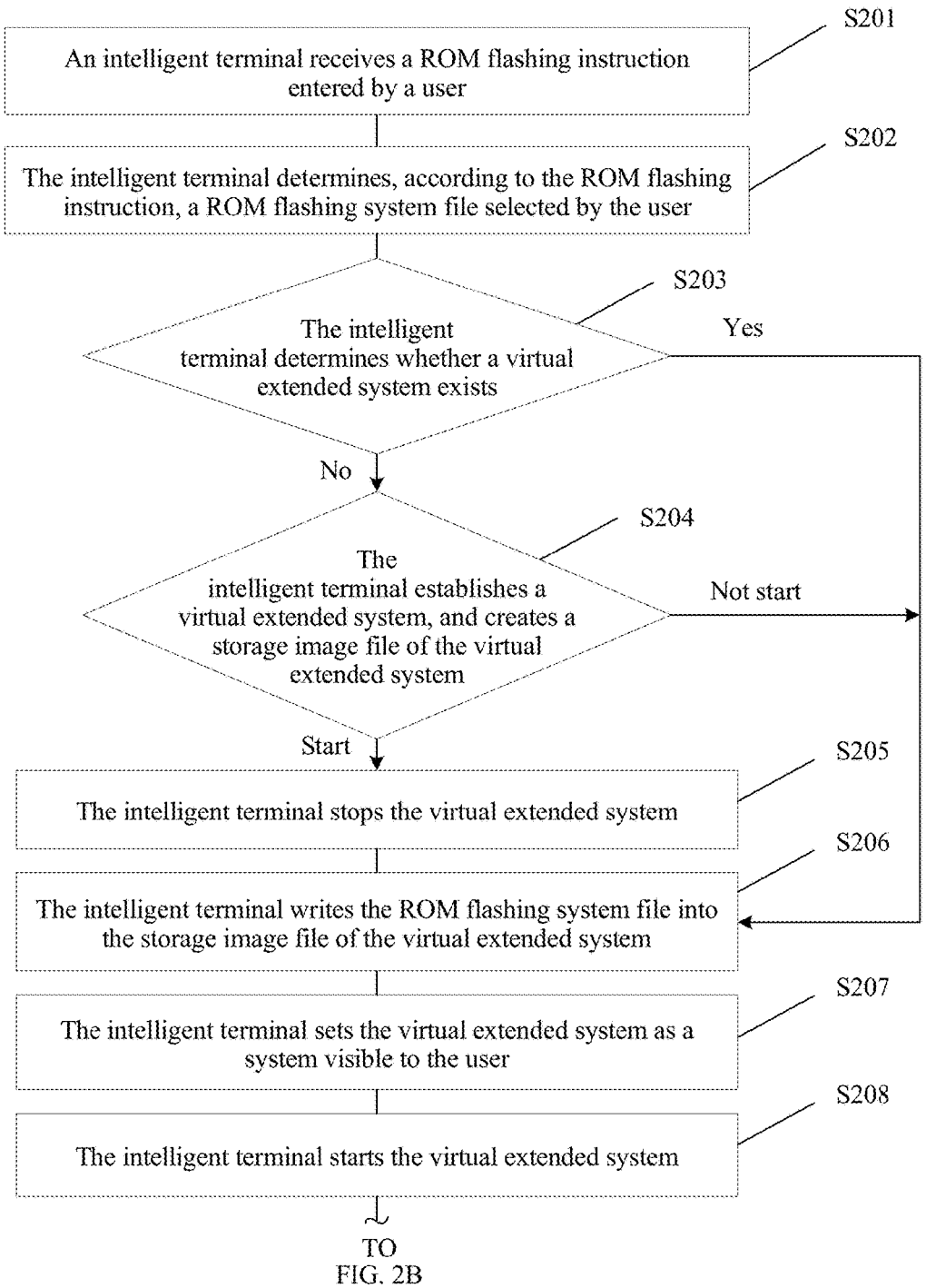
FIG. 2A and FIG. 2B are schematic flowcharts of another ROM flashing method according to an embodiment of the present disclosure.
Figure 2B:
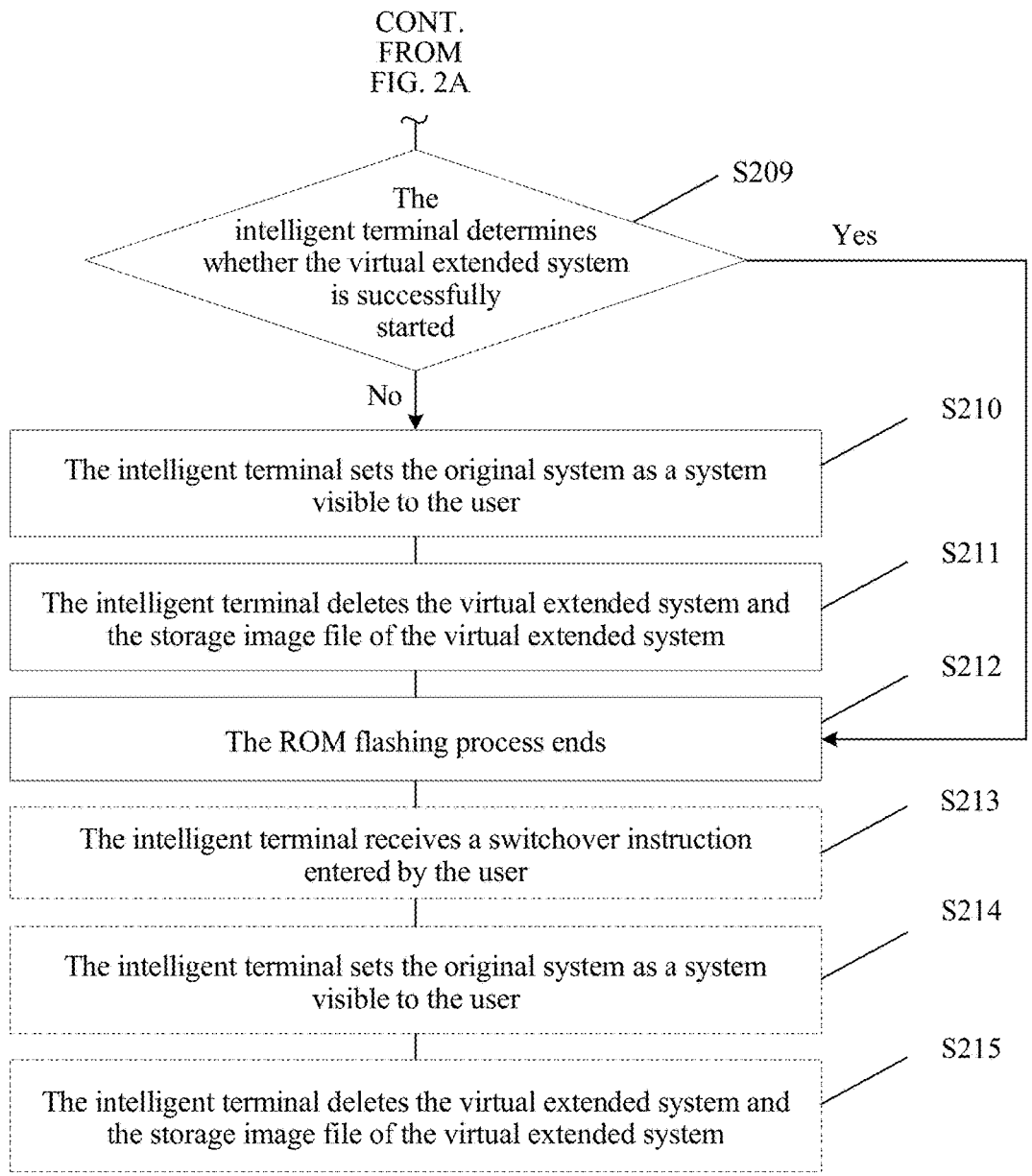

An embodiment of the present disclosure provides another ROM flashing method, which is applied to an intelligent terminal. The intelligent terminal includes an original system virtualized by using a virtualization technology, to run a factory system file of the intelligent terminal. A user M who uses an intelligent terminal currently uses an original system (system A) of the intelligent terminal. Now the user intends to use a system B on the intelligent terminal by means of ROM flashing. In this embodiment, a process of performing ROM flashing on the intelligent terminal by the user M is used as an example to describe in detail the method shown in FIG. 1. Referring to FIG. 2A and FIG. 2B, the method may include the following steps.

S201: Receive a ROM flashing instruction entered by the user.

It should be noted that S201 is the same as S101, and details are not repeatedly described herein.

Figure 3:
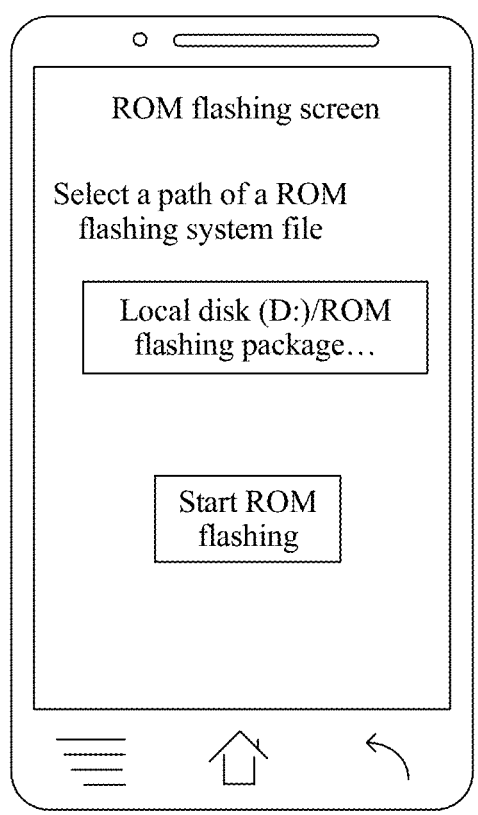
FIG. 3 is a schematic diagram of a ROM flashing screen of an intelligent terminal according to an embodiment of the present disclosure.

For example, the user first enters a ROM flashing screen of the intelligent terminal shown in FIG. 3, selects "Select a path of a ROM flashing system file", and then clicks "Start ROM flashing". The intelligent terminal receives the ROM flashing instruction entered by the user. The ROM flashing instruction includes a storage path of a ROM flashing system file selected by the user, and the ROM flashing system file is a file of the system B.

S202: The intelligent terminal determines, according to the ROM flashing instruction, a ROM flashing system file selected by the user.

For example, the intelligent terminal determines, according to the storage path that is of the ROM flashing system file selected by the user and that is included in the ROM flashing instruction, the ROM flashing system file selected by the user.

S203: The intelligent terminal determines whether a virtual extended system exists. If no virtual extended system exists, S204 is performed. If a virtual extended system exists, S205 is performed.

For example, the user M currently uses the original system of the intelligent terminal, and no virtual extended system exists in the intelligent terminal; therefore, S204 is performed.

S204: The intelligent terminal establishes a virtual extended system, and creates a storage image file of the virtual extended system. A virtualization technology is used to establish the virtual extended system, and create the storage image file of the virtual extended system, to write the ROM flashing system file.

The virtual extended system and the original system are virtualized in the intelligent terminal by using the virtualization technology, and are systems that run simultaneously and are mutually separated when system files are installed. The present disclosure sets no limitation on the used virtualization technology. For an establishment process, details are not described herein.

Optionally, during the process of performing S204, if the virtual extended system is started immediately after the virtual extended system is established, S205 and S206 need to be sequentially performed after S204.

Optionally, during the process of performing S204, if the virtual extended system is not started after the virtual extended system is established, S206 is performed after S204.

S205: The intelligent terminal stops the virtual extended system.

S206: The intelligent terminal writes the ROM flashing system file into the storage image file of the virtual extended system.

For example, the intelligent terminal writes the file of the system B into the storage image file of the virtual extended system.

S207: The intelligent terminal sets the virtual extended system as a system visible to the user.

S208: The intelligent terminal starts the virtual extended system to run the ROM flashing system file.

Further, the virtual extended system and the original system may be simultaneously run.

S209: The intelligent terminal determines whether the virtual extended system is successfully started.

If the virtual extended system fails to be started, S212 is performed after S210 and S211 are performed.

If the virtual extended system is successfully started, S212 is directly performed to enter the virtual extended system.

S210: The intelligent terminal sets the original system as a system visible to the user.

S211: The intelligent terminal deletes the virtual extended system and the storage image file of the virtual extended system.

S212: The ROM flashing process ends.

At this point, the intelligent terminal has completed the ROM flashing operation according to the instruction from the user M. If the ROM flashing succeeds, the user M uses the system B when using the intelligent terminal. If the ROM flashing fails, the user M still uses the system A when using the intelligent terminal.

Further, after the ROM flashing is completed by performing S201 to S212, if the ROM flashing succeeds, the user M uses the system B when using the intelligent terminal. However, in a use process, it is assumed that the user M finds that the system B does not match the intelligent terminal, and intends to switch back to the system A for use, to obtain better user experience. In this case, the method may further include S213 to S215.

S213: The intelligent terminal receives a switchover instruction entered by the user.

The switchover instruction is used to instruct the intelligent terminal to set the original system as a system visible to the user.

Figure 4:
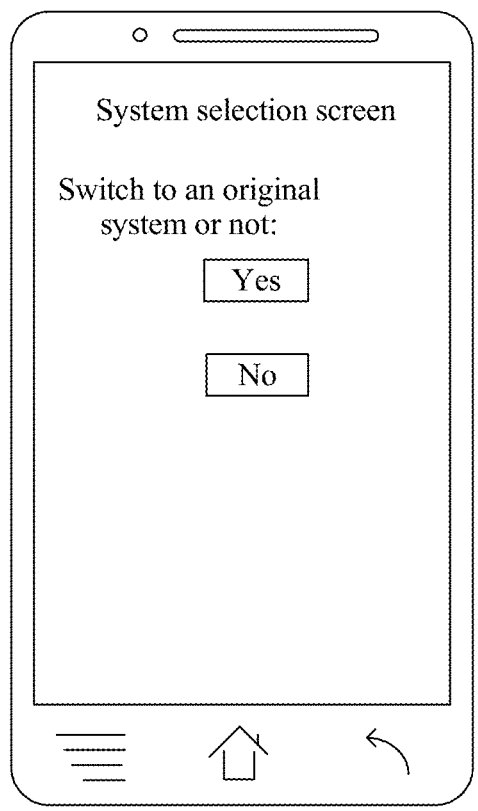
FIG. 4 is a schematic diagram of a recovery screen of an intelligent terminal according to an embodiment of the present disclosure.

For example, the user first enters a switchover system screen of the intelligent terminal shown in FIG. 4, and selects "Switch to an original system" according to a prompt. The intelligent terminal receives the switchover instruction entered by the user.

S214: The intelligent terminal sets the original system as a system visible to the user.

S215: The intelligent terminal deletes the virtual extended system and the storage image file of the virtual extended system.

According to the ROM flashing method provided in this embodiment of the present disclosure, ROM flashing on an intelligent terminal is completed by writing a ROM flashing system file provided by a user into a storage image file of a virtual extended system. In this way, the ROM flashing on the intelligent terminal does not produce any damage because two virtual systems are mutually separated, and a new system installed by means of the ROM flashing is totally separated from an original system delivered with the intelligent terminal. In any case, the original system can be recovered without loss, thereby implementing lossless ROM flashing on the original system of the intelligent terminal.

Further, the virtual extended system and the original system can run simultaneously, so that a switchover between the systems can be quickly implemented.

An embodiment of the present disclosure provides an intelligent terminal 50. The intelligent terminal 50 includes a virtual extended system and an original system. The original system is configured to run a factory system file of the intelligent terminal 50. The virtual extended system is configured to run a ROM flashing system file.

Figure 5:
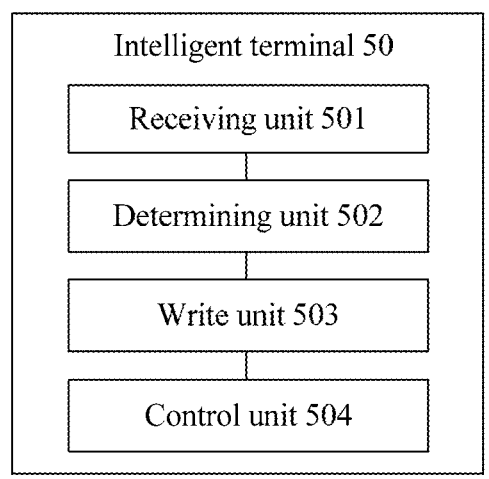
FIG. 5 is a schematic structural diagram of an intelligent terminal according to an embodiment of the present disclosure.

Referring to FIG. 5, the intelligent terminal 50 may include:

a receiving unit 501, configured to receive a ROM flashing instruction entered by a user;

a determining unit 502, configured to determine, according to the ROM flashing instruction, a ROM flashing system file selected by the user;

a write unit 503, configured to write the ROM flashing system file into a storage image file of the virtual extended system; and a control unit 504, configured to start the virtual extended system to run the ROM flashing system file.

Figure 6:
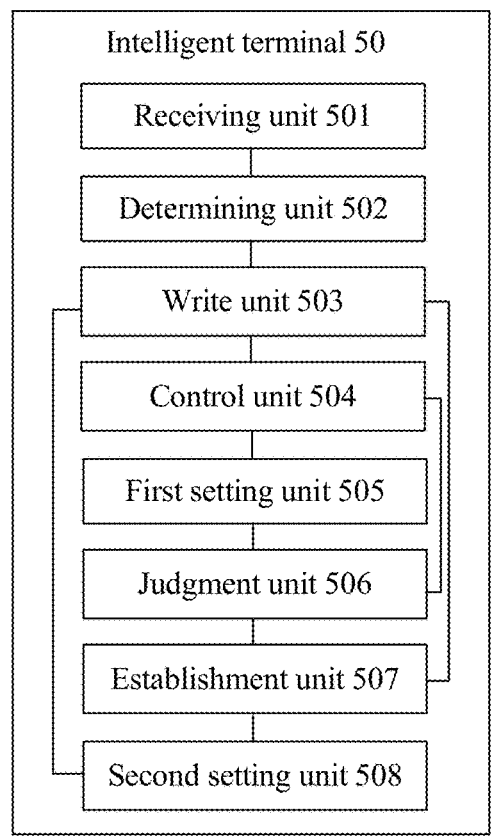
FIG. 6 is a schematic structural diagram of another intelligent terminal according to an embodiment of the present disclosure.

Further, referring to FIG. 6, the intelligent terminal 50 may further include:

a first setting unit 505, configured to set the original system as a system visible to the user if the virtual extended system fails to be started, and delete the virtual extended system and the storage image file of the virtual extended system.

Further, referring to FIG. 6, the intelligent terminal 50 may further include:

a judgment unit 506, configured to determine whether a virtual extended system exists in the intelligent terminal; where the write unit 503 may be further configured to: if the judgment unit 506 determines that a virtual extended system exists in the intelligent terminal, write the ROM flashing system file into the storage image file of the virtual extended system; and an establishment unit 507, configured to: if the judgment unit 506 determines that no virtual extended system exists in the intelligent terminal, establish a virtual extended system, and create a storage image file of the virtual extended system.

Optionally, the intelligent terminal further includes a second setting unit 508. The second setting unit 508 is configured to:

after the write unit 503 writes the ROM flashing system file into the storage image file of the virtual extended system, set the virtual extended system as a system visible to the user.

Further, the receiving unit 501 is further configured to: if the receiving unit 501 receives a switchover instruction, set the original system as a system visible to the user.

According to the intelligent terminal 50 provided in this embodiment of the present disclosure, ROM flashing on the intelligent terminal is completed by writing a ROM flashing system file provided by a user into a storage image file of a virtual extended system. In this way, the ROM flashing on the intelligent terminal does not produce any damage because two virtual systems are mutually separated, and a new system installed by means of the ROM flashing is totally separated from an original system delivered with the intelligent terminal. In any case, the original system can be recovered without loss, thereby implementing lossless ROM flashing on the original system of the intelligent terminal.

An embodiment of the present disclosure provides another intelligent terminal 60. The intelligent terminal 60 includes a virtual extended system and an original system. The original system is used to run a factory system file of the intelligent terminal 60, and the virtual extended system is used to run a ROM flashing system file.

Figure 7:
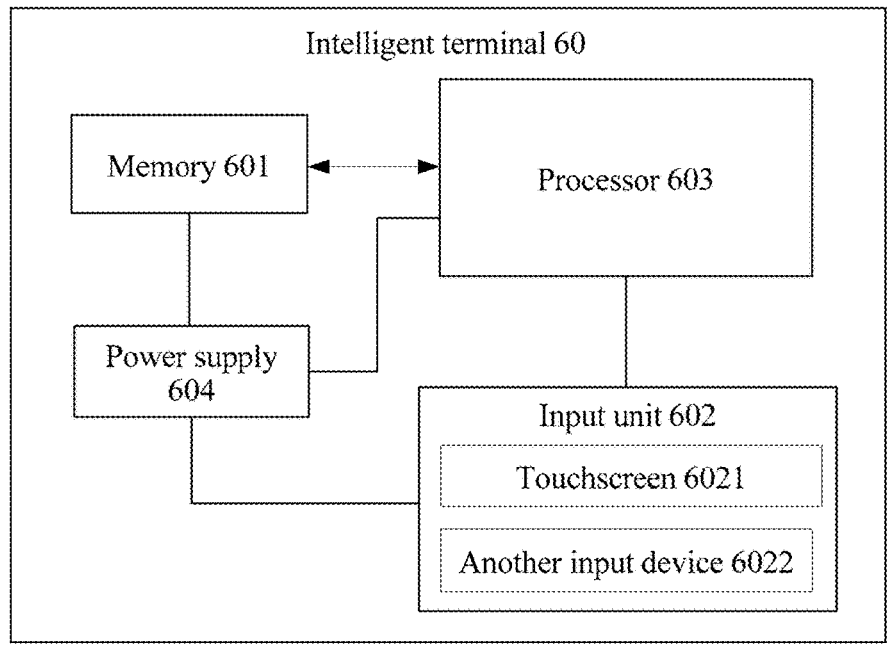
FIG. 7 is a schematic structural diagram of still another intelligent terminal according to an embodiment of the present disclosure.

Referring to FIG. 7, FIG. 7 is a schematic structural diagram of a mobile intelligent terminal according to an embodiment of the present disclosure.

The mobile intelligent terminal may be an intelligent terminal device such as a mobile phone, a tablet computer, a notebook computer, an ultra-mobile personal computer (UMPC), a netbook, a personal digital assistant (PDA). FIG. 7 shows a block diagram of partial structure of the intelligent terminal 60 related to the embodiments of the present disclosure.

As shown in FIG. 7, the intelligent terminal 60 may include components such as a memory 601, an input unit 602, a processor 603, and a power supply 604. A person killed in the art may understand that the structure of the intelligent terminal shown in FIG. 7 constitutes no limitation on the intelligent terminal, and the intelligent terminal may include components more or less than those shown in FIG. 7, or a combination of some components, or different component arrangements.

The following describes each compositional component of the intelligent terminal 60 with reference to FIG. 7.

The memory 601 may be configured to store a software program and a module, and the processor 603 runs the software program and the module that are stored in the memory 601, so as to execute various functional applications of the intelligent terminal 60 and processes data. The memory 601 may mainly include a program storage area and a data storage area. The program storage area may store an operating system, and an application required by at least one function (such as a voice playing function or an image playing function), and the like. The data storage area may store data (such as audio data, image data, and a phonebook) and the like created according to use of the mobile phone 60. In addition, the memory 601 may include a high-speed random access memory, and may further include a nonvolatile memory, such as at least one magnetic disk storage device, a flash memory device, or another volatile solid-state storage device.

The input unit 602 may be configured to receive an inputted number or character information, and generate key signal input related to user settings and function control of the intelligent terminal 60. The input unit 602 may include a touchscreen 6021 and another input device 6022. The touchscreen 6021 is also referred to as a touch panel and may collect a touch operation performed by a user on or nearby the touchscreen 6021 (for example, an operation performed by a user on the touchscreen 6021 or near the touchscreen 6021 by using any suitable object or accessory, such as a finger or a stylus), and drive a corresponding connected apparatus according to a preset program. Optionally, the touchscreen 6021 may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into contact coordinates, transfers the contact coordinates to the processor 603, and can receive and execute a command sent by the processor 603. In addition, the touchscreen 6021 may be implemented in multiple types such as a resistive type, a capacitive type, infrared, and a surface acoustic wave. Except the touchscreen 6021, the input unit 602 may further include another input device 6022. The another input device 6022 may include but is not limited to one or more of a physical keyboard, a function key (such as a volume control key and a power switch key), a trackball, a mouse, a joystick, and the like.

The processor 603 is a control center of the intelligent terminal 60, and is connected to all parts of the entire intelligent terminal by using various screens and lines. The processor 603 executes various functions of the intelligent terminal 60 and processes data by running or executing the software program and/or the module that are/is stored in the memory 601 and by invoking data stored in the memory 601, so as to perform overall monitoring on the intelligent terminal. Optionally, the processor 603 may include one or more processing units. Preferably, the processor 603 may integrate an application processor and a modem processor. The application processor mainly processes an operating system, a user screen, an application, and the like. The modem processor mainly processes radio communication. It may be understood that the foregoing modem processor may be not integrated into the processor 603.

The intelligent terminal 60 further includes the power supply 604 (for example, a battery) that supplies power to each component. Preferably, the power supply may be logically connected to the processor 603 by using a power management system, so that functions such as charging and discharging management and power consumption management are implemented by using the power management system.

In this embodiment of the present disclosure, the processor 603 is configured to receive a ROM flashing instruction entered by a user by using the input unit 602.

The processor 603 may be further configured to determine, according to the ROM flashing instruction, a ROM flashing system file selected by the user.

The processor 603 may be further configured to write the ROM flashing system file into a storage image file of a virtual extended system.

The processor 603 may be further configured to start the virtual extended system to run the ROM flashing system file.

Further, the processor 603 may be further configured to: after starting the virtual extended system, if the virtual extended system fails to be started, set the original system as a system visible to the user, and delete the virtual extended system and the storage image file of the virtual extended system.

Further, the processor 603 may be further configured to:
determine whether the virtual extended system exists in the intelligent terminal; and
if the virtual extended system exists in the intelligent terminal, write the ROM flashing system file into the storage image file of the virtual extended system; or if no virtual extended system exists in the intelligent terminal, establish the virtual extended system, and create a storage image file of the virtual extended system.

Further, the processor 603 may be further configured to:
set the virtual extended system as a system visible to the user after writing the ROM flashing system file into the storage image file of the virtual extended system.

Further, the processor 603 may be further configured to receive a switchover instruction entered by the user by using the input unit 602.

The processor 603 may be further configured to, if the switchover instruction is received, set the original system as a system visible to the user.

In conclusion, the foregoing descriptions are merely examples of embodiments of the present disclosure, but are not intended to limit the protection scope of the present disclosure. Any modification, equivalent replacement, or improvement made without departing from the spirit and principle of the present disclosure shall fall within the protection scope of the present disclosure.

According to the intelligent terminal 60 provided in this embodiment of the present disclosure, ROM flashing on the intelligent terminal is completed by writing a ROM flashing system file provided by a user into a storage image file of a virtual extended system. In this way, the ROM flashing on the intelligent terminal does not produce any damage because two virtual systems are mutually separated, and a new system installed by means of the ROM flashing is totally separated from an original system delivered with the intelligent terminal. In any case, the original system can be recovered without loss, thereby implementing lossless ROM flashing on the original system of the intelligent terminal.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some screens. The indirect couplings or communication connections between the apparatuses or units may be implemented in electronic or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

When the foregoing integrated unit is implemented in a form of a software functional unit, the integrated unit may be stored in a computer-readable storage medium. The software functional unit is stored in a storage medium and includes several instructions for instructing a computer device (which may be a personal computer, a server, or a network device) to perform some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

Finally, it should be noted that the foregoing embodiments are merely intended for describing the technical solutions of the present disclosure but not for limiting the present disclosure. Although the present disclosure is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A read-only memory (ROM) flashing method for use with an intelligent terminal comprising a virtual extended system and an original system, wherein the original system is configured to run a factory system file of the intelligent terminal, and the virtual extended system is configured to run a ROM flashing system file, the method comprising:
   receiving a ROM flashing instruction entered by a user;
   determining, according to the ROM flashing instruction, a ROM flashing system file selected by the user;
   writing the ROM flashing system file into a storage image file of the virtual extended system, wherein the original system and the virtual extended system are both implemented as virtual machines including an application, a bottom-layer framework, and a kernel; and
   starting the virtual extended system to run the ROM flashing system file.

2. The method according to claim 1, wherein after starting the virtual extended system, the method further comprises:
   if the virtual extended system fails to start, setting the original system as a system visible to the user and deleting the virtual extended system and the storage image file of the virtual extended system.

3. The method according to claim 1, wherein before writing the ROM flashing system file into the storage image file of the virtual extended system, the method further comprises:
   determining whether the virtual extended system exists in the intelligent terminal; and
   if the virtual extended system exists in the intelligent terminal, writing the ROM flashing system file into the storage image file of the virtual extended system, or if no virtual extended system exists in the intelligent terminal, establishing the virtual extended system and creating a storage image file of the virtual extended system.

4. The method according to claim 1, wherein after writing the ROM flashing system file into a storage image file of the virtual extended system, the method further comprises:
setting the virtual extended system as a system visible to the user.

5. The method according to claim 1, wherein after starting the virtual extended system, the method further comprises:
if a switchover instruction entered by the user is received, setting the original system as a system visible to the user.

6. An intelligent terminal, comprising:
a memory; and
a processor in communication with the memory, wherein the processor is configured to:
execute an original system configured to run a factory system file of the intelligent terminal; and
execute a virtual extended system configured to run a ROM flashing system file, wherein the original system and the virtual extended system are both implemented as virtual machines including an application, a bottom-layer framework, and a kernel;
receive a ROM flashing instruction entered by a user;
determine, according to the ROM flashing instruction, a ROM flashing system file selected by the user;
write the ROM flashing system file into a storage image file of the virtual extended system; and
run the ROM flashing system file.

7. The intelligent terminal according to claim 6, wherein the processor is further configured to:
when the virtual extended system fails to be started, set the original system as a system visible to the user and delete the virtual extended system and the storage image file of the virtual extended system.

8. The intelligent terminal according to claim 6, wherein the processor is further configured to:
determine whether the virtual extended system exists in the intelligent terminal;
when no virtual extended system exists in the intelligent terminal, establish the virtual extended system and create a storage image file of the virtual extended system; and
when the virtual extended system exists in the intelligent terminal, write the ROM flashing system file into a storage image file of the virtual extended system.

9. The intelligent terminal according to claim 6, wherein the processor is further configured to: after writing the ROM flashing system file into the storage image file of the virtual extended system, set the virtual extended system as a system visible to the user.

10. The intelligent terminal according to claim 6, wherein the processor is further configured to: when the receiving unit receives a switchover instruction, set the original system as a system visible to the user.

* * * * *